Sept. 4, 1973    D. W. PUGH ET AL    3,756,996
PROCESS FOR THE PRODUCTION OF ETHYLENE POLYMERS
Original Filed Oct. 2, 1964    4 Sheets-Sheet 1

DONALD W. PUGH
ROLAND J. SPOMER
CHARLES J. WOLFENBERGER
WILLIAM H. PALMER
ROBERT W. HORNEY

BY

United States Patent Office 3,756,996
Patented Sept. 4, 1973

3,756,996
PROCESS FOR THE PRODUCTION OF ETHYLENE POLYMERS
Donald W. Pugh, Roland J. Spomer, and Charles Wolfenberger, Tuscola, and William H. Palmer and Robert W. Horney, Champaign, Ill., assignors to National Distillers and Chemical Corporation, New York, N.Y.
Continuation of abandoned applications Ser. No. 710,682, Feb. 20, 1968, and Ser. No. 401,153, Oct. 2, 1964. This application Feb. 25, 1971, Ser. No. 118,987
Int. Cl. C08f 1/60, 3/04
U.S. Cl. 260—87.3                5 Claims

ABSTRACT OF THE DISCLOSURE

A process and apparatus for the production of ethylene polymers at high pressures within a modified, stirred autoclave-type reaction system subdivided into three zones, into the first of which a first, low temperature free radical, chain-initiating catalyst is fed, and into the second of which a second, intermediate temperature free radical, chain-initiating catalyst and a third, high temperature free radical, chain-initiating catalyst are introduced. The first zone is so agitated as to produce both radial and end-to-end mixing therein to thereby establish a substantially uniform reaction temperature therein, whereas the second zone is so agitated as to produce radial mixing therein, with the degree of end-to-end mixing decreasing longitudinally of the zone to thereby establish a temperature differential longitudinally thereof. Both radial and end-to-end mixing are established within the third zone in a manner such as to increase back mixing of the reaction mixture therein, and thereby control the temperature of the reaction mixture leaving such zone and exiting from the reaction system.

---

This application is a continuation of copending applications Ser. Nos. 401,153 and 710,682 filed on Oct. 2, 1964 and Feb. 20, 1968, respectively, and which are now abandoned.

This invention relates to a process and apparatus for the polymerization of olefins, and more particularly, to such a process and apparatus for producing branched chain polyethylene resins having improved optical and processing characteristics.

In the following specification all parts and percentages are given by weight, unless otherwise indicated.

While the following discussion is principally directed to the homopolymerization of ethylene, the process and apparatus of the present invention may be utilized in connection with the interpolymerization of ethylene with any suitable ethylenically unsaturated compounds known to copolymerize therewith including, for example, those interpolymerizable compounds identified in Perrin et al. Pat. No. 2,200,429 granted on May 14, 1940, assigned to Imperial Chemical Industries, Ltd., and Hanford Pat. No. 2,396,785 granted on Mar. 19, 1946, assigned to E. I. du Pont de Nemours and Co. It will therefore be understood that the process for polymerizing ethylene of the present invention includes within its scope both the homopolymerization and interpolymerization of ethylene in accordance with the procedure described more fully hereinafter.

It is known to produce polyethylene by high pressure polymerization within stirred autoclave reactors such as described, for example, in Krase et al. Pat. No. 2,396,791 granted on Mar. 19, 1946, and Cristl Pat. No. 2,897,183 granted on July 28, 1959, both assigned to E. I. du Pont de Nemours and Co. Such reaction systems are maintained at substantially constant temperatures. Resins produced in this manner have relatively poor processing characteristics for film-forming and molding applications.

It is known, as described in Perrin et al. Pat. No. 2,188,465 granted on Jan. 30, 1940, assigned to Imperial Chemical Industries, Ltd. that the molecular weight of a polyethylene resinous product varies inversely with the polymerization reaction temperature. Polyethylene resins have heretofore been produced, making use of such fact, in tubular type reaction systems in which the reaction temperatures vary between the ends of the reaction zones. Such a tubular system may, however, be of considerable length, e.g., from about 200 to 2,000 feet and of relatively small internal cross-section, e.g., it may have an internal diameter of from about ⅜ to 2 inches, and thus present problems in achieving uniform synthesis conditions.

It has also been proposed to produce polyethylene resins employing a reaction system having characteristics between those of the autoclave and tubular reaction systems discussed hereinabove. Reaction systems of such type are disclosed, for example, in Oakes Pat. No. 2,868,762 granted on Jan. 13, 1959, assigned to Imperial Chemical Industries, Ltd., and Rader Pat. No. 2,964,515 granted on Dec. 13, 1960, assigned to the assignee of the present invention. One such system involves the use of a stirred autoclave type reaction zone having a length-to-diameter ratio of from about 6:1 to 12:1, through which ethylene feed gas is longitudinally passed. A catalyst or a pair of catalysts is injected at one or more positions along the length of the reaction zone to catalyze the polymerization, the temperature of the reaction mixture increasing along the length of the reaction zone.

In such system, it has been found that the temperature range at which the polymerization is effected directly determines the processing characteristics of the resin produced. These temperatures can drastically increase at a point intermediate the ends of the reaction zone. The consequent split temperature profile of the reaction system results in the formation of a resin whose optical properties and strength characteristics are not suitable for film and molding applications.

It is accordingly among the objects of the present invention to provide an improved process and apparatus for the production of an ethylene polymerization product having superior optical and processing characteristics.

A further object of the invention is to provide such a process, and an apparatus useful therefor, which has relatively high production capacities, being operable at relatively high pressures in excess of about 25,000 p.s.i., and which can be efficiently controlled to operate in accordance with a predetermined, substantially continuous increasing temperature profile to produce improved polyethylene resins.

Yet an additional object of the invention is to provide an apparatus for the high pressure polymerization of ethylene which is efficient in design and operation, and which permits achieving the unique set of reaction conditions resulting in formation of the desired resin product.

These and other objects and advantages of the invention will become more apparent from the following description, taken in connection with the accompanying drawings in which.

Figure 2:
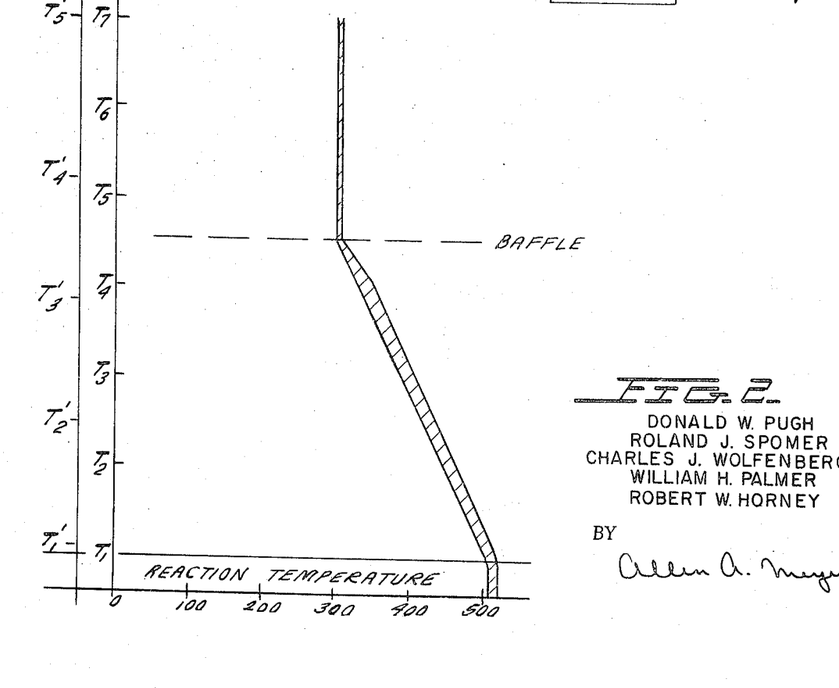
FIG. 2 is a temperature profile curve indicating typical temperatures maintained within the several zones in the polymerization reactor.

It has been found, in accordance with the present invention, that improved polyethylene resins may be produced by carrying out the polymerization in a modified, stirred autoclave type reaction system in which the ethylene gas feed rates, the volume and dimensions of the reaction region, the pressure, temperatures and degrees of agitation utilized, and the catalysts and their mode of injection are such as to produce a temperature profile longitudinally of the reaction region substantially corresponding to that illustrated in FIG. 2 of the annexed drawings. When such a temperature profile is maintained, it has been found that an ethylene polymerization product is formed having improved optical and processing characteristics suitable for use in film-forming or molding application.

The process for producing such polyethylene resins in accordance herewith involves feeding ethylene gas under pressure longitudinally into a reaction region, the resulting reaction mixture fed through such region being maintained under an elevated pressure of from about 25,000 to 45,000 p.s.i. and at temperatures varying longitudinally of the reaction region from about 280° to 550° F. The ethylene is initially passed through a first reaction zone within such region, into which a first, low temperature catalyst effective for catalyzing the polymerization of ethylene to polyethylene at temperatures within the range of from about 280° to 420° F., is also introduced. The resulting reaction mixture is agitated within the first zone to produce both radial and end-to-end mixing, thereby maintaining a substantially uniform reaction temperature therein.

The reaction mixture is thereafter removed from the end of the first zone and introduced into a second zone where it is mixed with a plurality of catalysts including a second, intermediate temperature catalyst effective for catalyzing the polymerization at temperatures of from about 320° to 500° F., and a third, high temperature catalyst effective for catalyzing the polymerization at temperatures of from about 430° to 550° F. The reaction mixture in the second zone is agitated to produce good radial mixing therein, the degree of end-to-end mixing decreasing, however, lengthwise of the zone to thereby establish a temperature differential longitudinally thereof.

The reaction mixture is thereafter removed from the end of the second zone and introduced into a third reaction zone in which it is agitated to produce both radial and end-to-end mixing thereof, the degree of end-to-end mixing in the third zone being greater than the degree of end-to-end mixing within the adjacent portion of the second zone, thereby increasing back mixing of the reaction mixture in the third zone and preventing the temperature of the reaction mixture exiting from such zone from increasing above about 550° F.

The reaction mixture removed from the last-mentioned zone is thereafter subjected to decompression and the polyethylene resin product separated from the effluent stream. The product thus formed has been found to possess excellent processing characteristics; e.g., lack of sensitivity to extrusion conditions, resistance to breakdown, ease of heat sealing and good drawdown, and optical properties; e.g., in terms of fisheyes, haze, gloss and transmittance properties.

The apparatus for polymerizing ethylene in accordance with the practice of the present invention includes an elongated vertically disposed reactor having a generally cylindrical interior reaction chamber therein. The ratio of length-to-diameter (L/D) is at least about 15:1 and may be as high as 20:1. At the top and at spaced intervals along the side wall of the reactor are conduits for the introduction of preselected portions of various feed materials. The reactor contains a partition which is normal to its axis, and which restricts the flow of the mixture of catalyst and reactant materials within the reaction chamber. The partition separates the first and second reaction zones, hereinabove referred to. The polymerized resinous product is removed from the bottom of the reactor by a suitable conduit.

Agitation is provided within the reactor by a number of agitator blades which are attached to an agitator shaft extending through the axis of the reactor for its entire length. The shaft carries a number of agitator blades, a first group of blades being of a trapezoidal configuration and extending radially from the shaft so as to sweep an annulus representing a portion of the cross-sectional area of the reactor. A second group of agitator blades having a pentagonal configuration extends radially from the shaft to a point adjacent the inner cylindrical wall of the reactor. The respective sets of blades are angularly adjusted so as to move the reaction mixture upwardly through the annular portion of the reaction chamber near the agitator shaft and downwardly along a portion of the reaction chamber near the cylindrical side walls thereby producing the desired radial and/or end-to-end mixing required by the present process.

The motor for rotating the agitator shaft is at the top of the reactor. As the motor is located within the reactor housing rather than in a separate housing secured thereto, the reactor can be sealed by a single seal at each of the top and bottom ends of the reaction chamber. A continuous shaft for the agitator blades is provided by engaging, through axial force, a tapered vertical extension of the agitator shaft and the motor shaft.

The reactor may further be characterized by the provision of jackets adapted to contain suitable heat transfer fluids, which are integral with the outer walls thereof. Between a machined indentation of the outer wall of the reactor and an outer cylindrical cover plate, an annular area is provided for the passage of heating or cooling fluid. In this manner, effective heat transfer with the reaction chamber is provided.

The reactor is provided with a safety rupture disc contiguous with the cylindrical wall of the reactor chamber. This arrangement assures accuracy of the pressure-sensing relief system and minimizes the possibility of build-up of undesired residual materials over the disc which might effect its response to excessive pressures, as would be the case if the disc were connected to the reaction chamber by a narrow passageway, as previously known.

The agitator blades are adjustably mounted and, depending upon the desired flow rate and reaction conditions, can be angularly disposed within limits so that generally they define an angle of at least 10° from the horizontal and at least 10° from the vertical. The number of blades along with their angular disposition determine the degree of radial and end-to-end mixing in any portion of the reactor and are adjustable to obtain any desired mixing and blending pattern. In the upper and lower portions of the reaction chamber where considerable back mixing is desired the blades are disposed at a greater angle from the horizontal than in the intermediate zone; e.g., from about 30° to 75° as compared with from about 10° to 45°.

Figure 1:
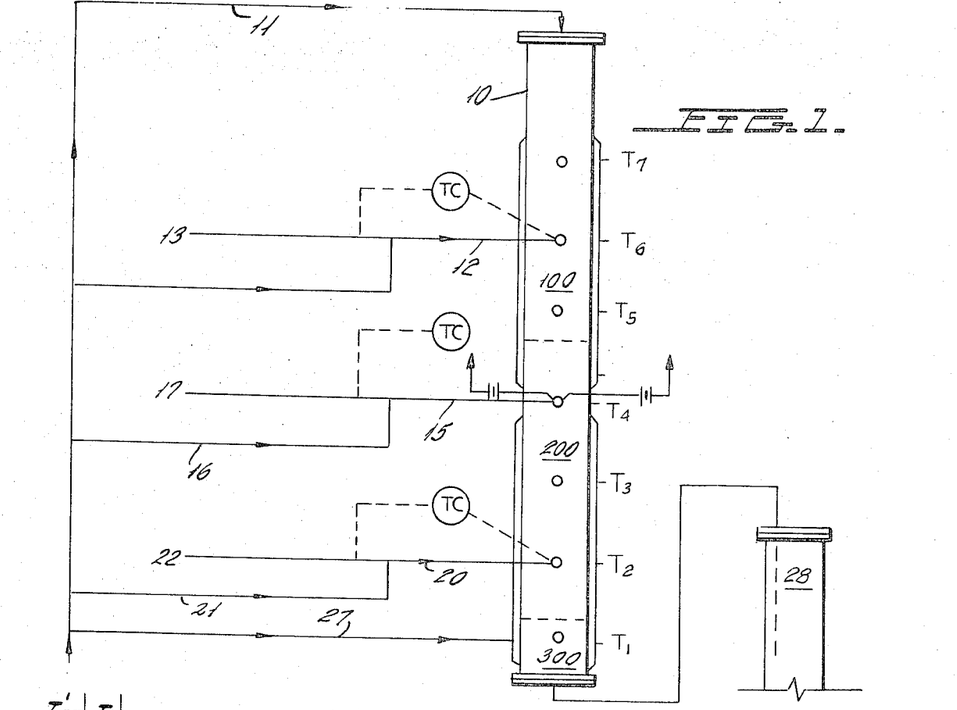
FIG. 1 is a schematic representation of one embodiment of the apparatus of the present invention.

The reaction system of the present invention is schematically illustrated in FIG. 1. The high pressure reactor vessel 10, which is a modified stirred autoclave is fed with a relatively small amount of olefin reactant through conduit 11, which enters the top of the reactor. The bulk of the monomer reactant enters the vessel through conduit 12, into which the catalyst is also fed from a source 13. Similarly, reactant and catalyst may be fed through conduit 15, reactant flowing through conduit 16 and catalyst supplied from source 17. Nearer the bottom of the reactor a similar arrangement is possible using conduits 20, 21 and 22. Conduit 27 is available for the introduction of relatively cool ethylene, which, when necessary, can be introduced to slow or quench the reaction at the bottom of the reactor. The polymerized mixture passes from the bottom of the reaction vessel through conduit 26 into a separator 28 wherein the bulk of the unreacted materials are removed from the reaction mixture.

Figure 3:
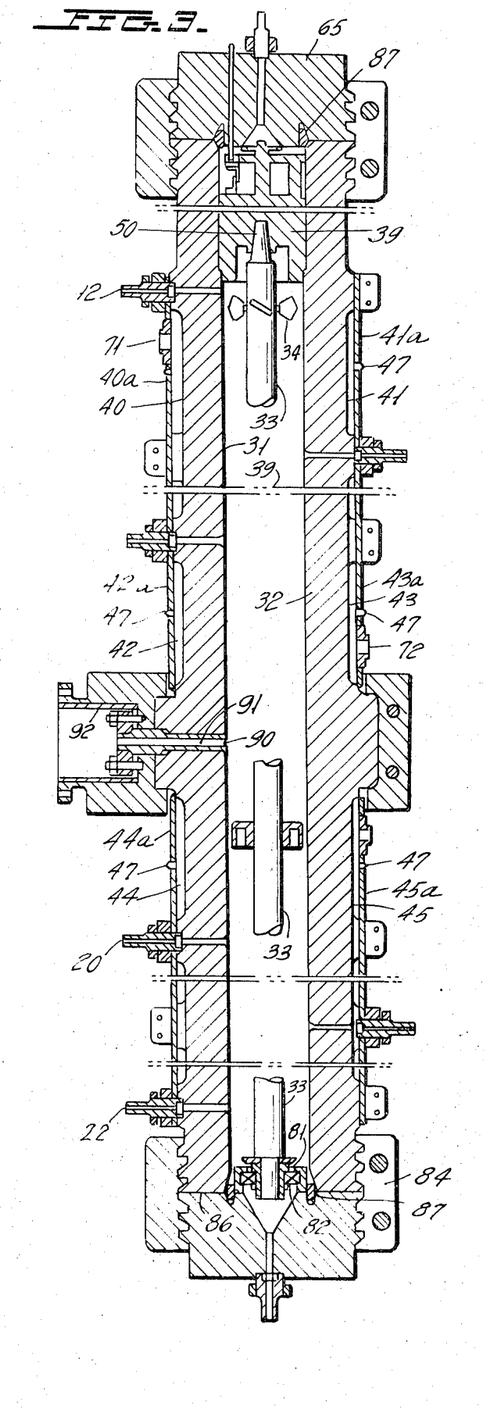
FIG. 3 is a vertical cross-section, partially broken, of the reactor schematically shown in FIG. 1.
Figure 4:
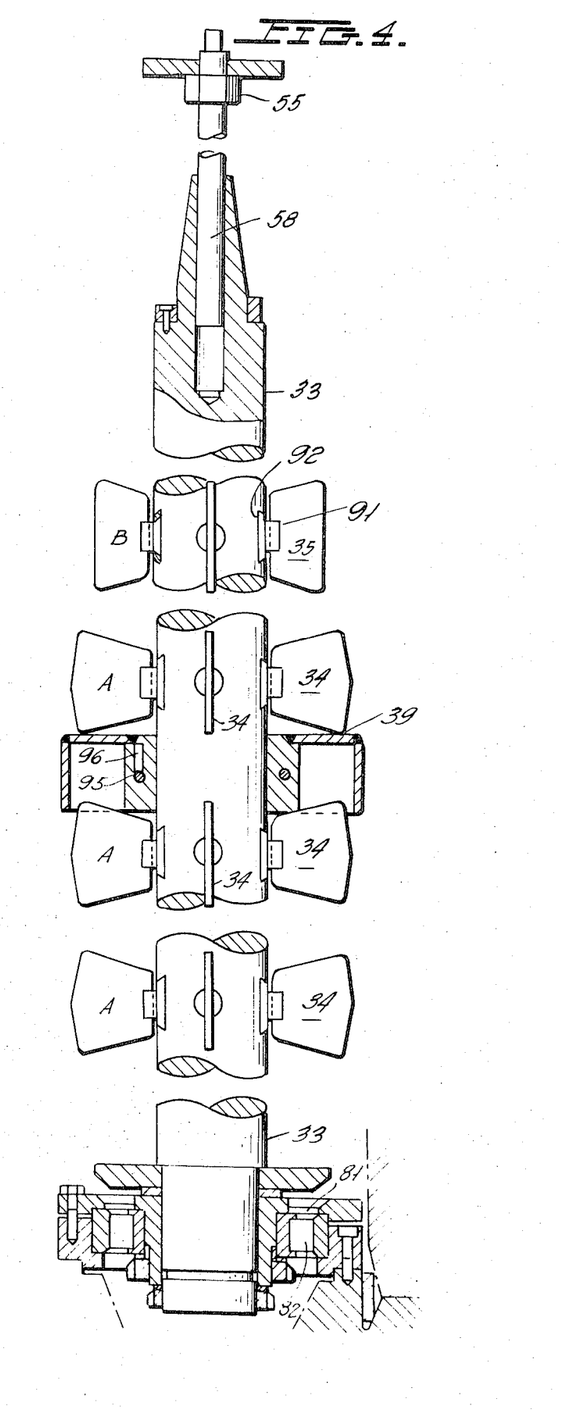
FIG. 4 is a partial vertical elevation of the agitator shaft assembly contained within the reactor.
Figure 8:
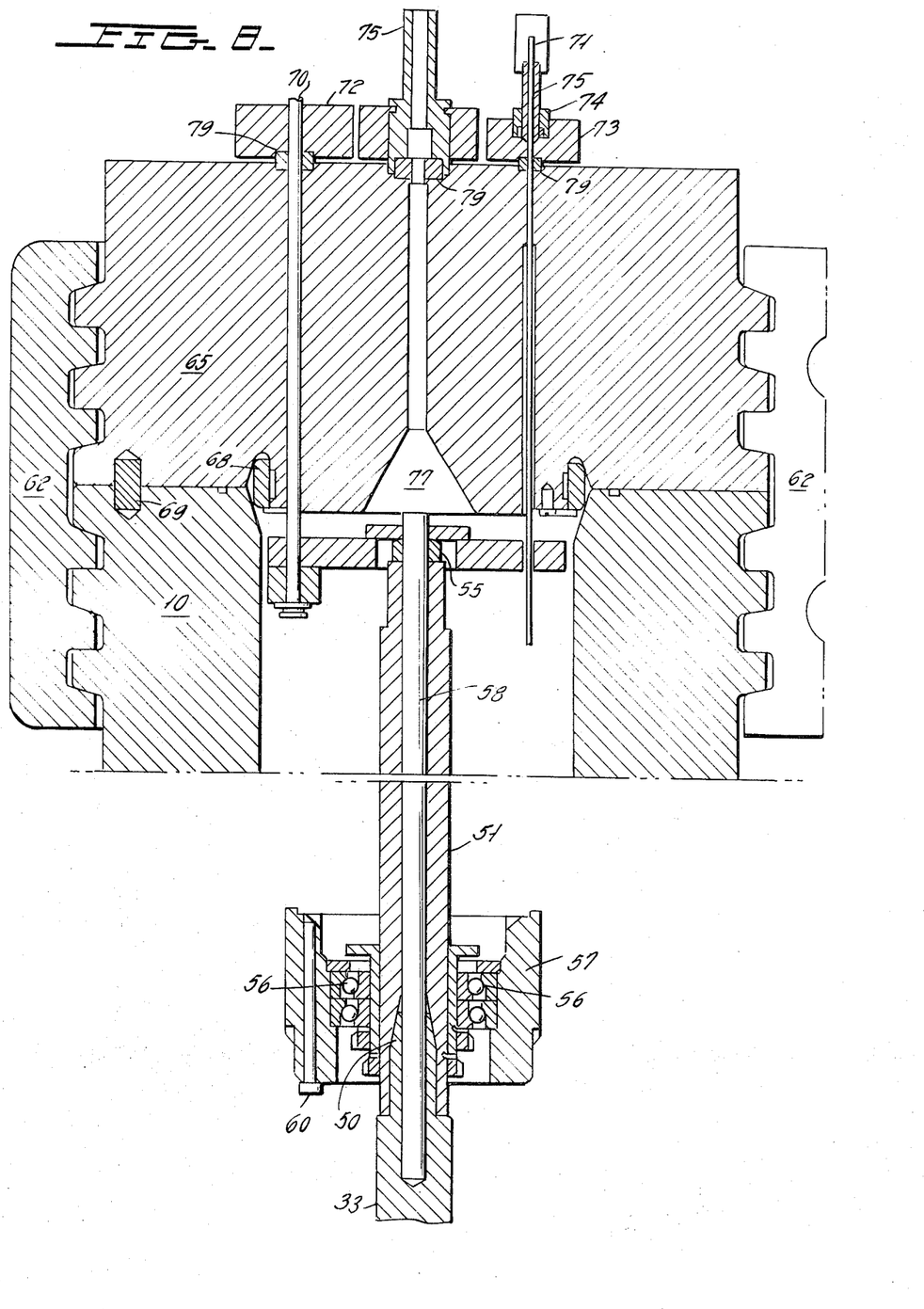
FIG. 8 is a vertical section of the top portion of the reactor, illustrating the drive and support for the agitator mechanism thereof.

Referring now to FIG. 3, it can be seen that the reaction vessel 10 is of a generally cylindrical configuration having a cylindrical side wall 31 sufficiently thick to withstand the high pressure reaction conditions herein set forth. The side wall presents a substantially smooth inner cylindrical surface 32. The motor assembly 39, illustrated in more detail in FIG. 8, is placed within the reaction chamber as is the agitator shaft 33 which carries two types of agitator blades, the structure and function of which are described in connection with the description of FIGS. 4 to 7.

The reaction chamber has a ratio of length-to-diameter greater than 15:1 and preferably of the order of about 16:1 although this ratio may be as high as 20:1. The reactor carries a number of integral annular jackets 40, 41, 42, 43, 44 and 45 which are provided by machining out the external wall of the reaction vessel and covering the machined-out area with cylindrical insulated cover plates designated 40a–45a, respectively, each carrying one or more expansion joints 47.

Because the reaction conditions herein contemplated utilize extremely high internal pressures and the walls 31 must be of substantial thickness it is important that the transfer of heat be made as efficient as possible. The present arrangement has been found to result in much more efficient heat transfer than attained in high pressure reactors previously employed for the polymerization of ethylene wherein it was necessary to secure a prefabricated external jacket to the reaction vessel and thereby increase the heat transfer between the heat transfer medium and the reaction mixture in the vessel. It should be understood that any suitable heat transfer medium may be employed such as steam, hot oil or Downtherm, or any suitable cooling fluid should this prove to be desirable for controlling or slowing the rate of the reaction. The heat transfer medium enters the annular jackets through a number of entry ports shown as 71a–f, respectively. A typical outlet port is shown as element 72. Since the pressure of the heat transfer medium is moderate; e.g., steam at 300 p.s.i., any typical joint known to the art for containing such pressures may be employed.

In the event that excessive pressure develops in the reaction vessel, a rupture disc 90 is provided. This disc is contiguous with the inner cylindrical wall of the reactor. This location of the rupture disc facilitates accurate control of the pressure release system and minimizes the risk that its operation may be impaired by the accumulation of resin or impurities as would be the case if the disc were at the outer end of passageway 91. In the event that excessive pressure buildup occurs in the reaction vessel, the disc is blown through passageway 91 and high pressure fitting 92. The high pressure gas is thus unimpeded in its passage out of the reactor.

The agitator shaft 33 has a tapered upper extension 50 which is secured to the motor shaft 51 in a manner hereinafter described in more detail. The support for the agitator shaft is at the top of the reaction vessel. The shaft 33 is guided radially by suitable guide members 80 located in an intermediate zone of the reactor and 81 located at the bottom of the reactor and carrying bearings 82. The bearings of the guide member 81 do not carry the weight of the agitator shaft since all of the weight is carried by the motor thrust bearings 56 at the top of the reactor. A suitable seal is provided at the bottom of the reactor by tightening the bottom head 84 and utilizing seal rings 87 so as to make a secure joint at 86.

Since the bottom bearing is a guide bearing only and need not support the weight of the agitator shaft any suitable type of roller or sleeve radial bearing or hydrodynamic bearing can be used. Thus, by supporting the agitator shaft at the top, high load bearings are kept out of the high temperature areas of the reaction zone. In accordance with this feature, high speed agitation with a long shaft member 33 can be effected.

Referring now to FIGS. 4 to 7, it can be seen that the agitator shaft carries a number of sets of agitator blades, which can be either of two types. One type of blade designated as element 34 and as a type "A" blade is of a pentagonal configuration and is designed to extend radially from the agitator shaft to a point adjacent the cylindrical surface of the reaction chamber. These blades may be as close as ⅛" to this surface. The A blades, being disposed in an angular direction indicated in FIG. 5, sweep substantially the entire cross-section of the reactor and cause the reaction mixture to flow downwardly when the agitator shaft is rotated in the direction indicated by the arrows, i.e., clockwise, looking down at the shaft.

Agitator blades 35 designated as type "B" blades are of a trapezoidal configuration and extend only a portion of the distance through the angular reaction zone, sweeping up to about 70% of that zone when the shaft is rotated. The B blades are also angularly disposed from the horizontal in a direction complementary to the angle of disposition of the A blades. The B blades tend to cause upward flow of the reaction mixture along an annular inner portion of the reaction zone. By increasing the relative number of B type blades and by suitably varying the angular disposition of the A and B type blades, the amount of upward flow in the reaction zone can be controlled, thereby facilitating regulation of the degree of back mixing in any preselected portion of the reaction zone. The A and B blades, as indicated above, perform different functions because of their radial dimensions and angular disposition with respect to the horizontal.

Figures 5, 6, 7:
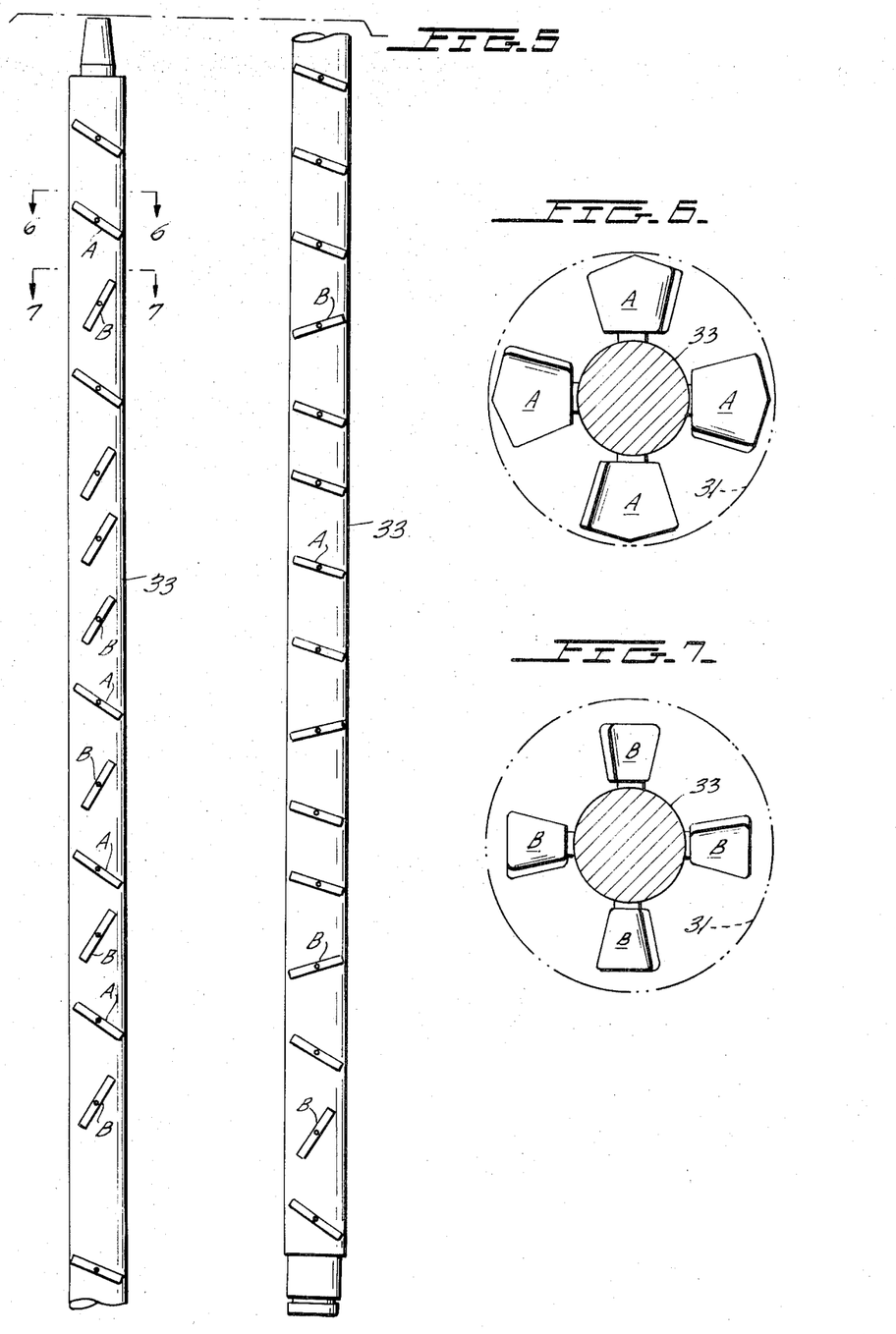
FIG. 5 is a schematic illustration of the agitator assembly showing a suitable blade orientation, with the assembly broken into top and bottom portions.
FIGS. 6 and 7 are horizontal cross-sections taken along the lines 6—6 and 7—7, respectively, of FIG. 5, showing the blade configurations at different levels of the agitator assembly.

In the embodiment illustrated in FIG. 5, it can be seen that the angular disposition of the A and B blades from the horizontal is greatest in the upper and lower portions of the reaction zone, i.e., above the partition 39 and below the lowest point of feed and catalyst entry and, more particularly in the reaction zones designated 100 and 300 in FIG. 1. Thus, back mixing is greatest in the upper and lower portions of the reaction chamber and is minimized in the intermediate portion, i.e., zone 200.

In the upper and lower portions of the reactor, the angular disposition of the respective types of blades from the horizontal may be between 30° and 75°, while in the intermediate portion the angular disposition may be between 10° and 45°.

The blades may be secured to the agitator shaft by securing the blade shaft 91 into a wedged opening in the shaft 92. The blades are rotatable and are maintained in a fixed position by a set screw.

Partition 39 is located between entry ports 12 and 15, and is secured by bolt 95 and set screw 96. The precise location of the partition can be varied depending on the desired processing conditions.

The top portion of the reactor and the support for the agitator shaft is illustrated in more detail in FIG. 8.

The agitator shaft 33 includes a tapered extension 50. This extension, and the shaft depending therefrom, is engaged by axial force to the motor rotor 51 at its lower end. The weight of the agtitator shaft is thus supported by motor thrust bearings 56 and the bearing structure is bolted to the motor by suitable bolts 60.

Because the motor is contained within the cylindrical reaction zone, it is possible to seal the vessel by seals formed solely at the opposite ends thereof. As shown in the drawings, the top seal is effected by tightening the bolt head strap so as to compress the seal ring 87 between the top head 65 and the upper portion of the reactor body 10. To properly align the top head and effect a tight seal, guide pin 69 and seal ring 68, respectively, are provided.

Electrodes 70 and thermocouple 71 extend through the top head of the reactor, being engaged by flanges 72 and 73, respectively, the thermocouple being further secured in position by gland nut 74, tightened against collar 75. Each of the elements entering the top of the reactor are further secured by cone rings 79.

Feed gas enters the top of the reactor through line 75, enters the reaction chamber through conical section 77, passes through the motor casing and then passes into the reaction chamber.

The reaction vessel 10 described hereinabove may be conveniently employed for the practice of our novel process by passing the ethylene gas feed stream successively through reaction zones 100, 200 and 300 (see FIGS. 1 and 2) of the vessel, whereby the polymerization is effected employing different conditions of mixing and catalyst injection to provide the desired temperature profile illustrated in FIG. 2. It will be understood that the particular parameters of ethylene feed rate and thruput, reaction zone volume and length-to-diameter ratio, reaction pressure, mixing conditions, catalyst compositions, proportions and the like, are interrelated and may be varied within the ranges defined more fully hereinafter to produce the desired reaction temperature profile.

The volume of the reaction region and, employing the preferred cylindrical type reaction vessel, the length-to-diameter ratio (L/D) thereof, is designed to obtain economic production capacities, preferably from about 2,000 to 7,000 pounds of polyethylene resin per hour, while permitting the polymerization reaction to "peak-out" within the reaction vessel. It is thus necessary to employ a relatively large reaction region, preferably of the order of about 10 cubic feet and an L/D ratio of at least about 15:1, to obtain optimum conversion and to minimize, if not prevent, further polymerization in the exit lines from the reaction vessel and in the separation system. By the use of the indicated reaction region volume and L/D ratio, high conversions are obtained while maintaining the magnitude of the temperature differential across the reactor.

In order to produce a branched chain ethylene polymer suitable for film-forming and molding operations, the successive reaction zones 100, 200 and 300 of the vessel 10 are maintained at an elevated pressure. It has been found that the use of pressures higher than those previously employed for the polymerization of ethylene, i.e., higher than about 25,000 p.s.i., provides resins having improved optical characteristics and results in the improved incorporation of modifiers or co-monomers, such as propylene, isobutylene or vinyl acetate, in the product resin; this, in turn, improves the optical properties of the resin and its impact strength. Consequently, we prefer to maintain the reaction region under pressures of from about 25,000 to 45,000 p.s.i., best results being obtained when the several reaction zones are maintained at pressures of from about 28,000 to 34,000 p.s.i.

The ethylene feed gas is introduced into the reaction zone 100 at a rate of from about 20,000 to 40,000 pounds of ethylene per hour. When the feed rate is increased within the indicated range, the optical characteristics of the resin products are somewhat degraded, thus making it desirable to utilize a correspondingly increased reaction pressure, within the pressure range specified. When, for example, the reaction region is maintained under 30,000 p.s.i. pressure, an ethylene gas feed rate of about 34,000 pounds per hour has been found satisfactory.

It has also been found that the conversion of ethylene to polyethylene in the reaction region varies directly by 0.04% per degree Fahrenheit difference between the feed gas temperature and the reaction vessel discharge temperature. In other words, when ethylene is fed to the reaction vessel at the rate of 25,000 pounds/hour, the conversion may be increased by 50 pounds/hour for each 5° F. increase in the temperature increment. Since, as described more fully hereinafter, it is desirable to maintain the exit temperature from the reaction vessel at values of less than 550° F., it is therefore preferred to operate with as low a feed gas temperature as possible, to maximize such increment.

On the other hand, the use of decreased feed gas temperatures results in the production of resinous products whose optical and other characteristics are not equal to those produced when employing higher feed gas temperatures. Consonant with the above requirements, the feed gas temperatures may range from about 75° to 250° F., it being preferred to preheat the feed gas to temperatures within such range in excess of 120° F., desirably in excess of temperatures of 180° F.

As indicated above, the ethylene enters zone 100 through inlet conduits 11 and 12 (FIG. 1), the greater proportion of the gas being introduced through conduit 12 and a minor portion of the feed being introduced through conduit 11 into and through the motor housing. It is desirable to feed at least 1,000 pounds/hour of the ethylene gas through the motor housing to prevent overheating thereof. Optimum results have been achieved when about 90% of the ethylene feed is introduced through conduit 12, with the balance being fed into reaction zone 100 through conduit 11.

A first, low temperature catalyst is introduced into the reaction zone 100 through conduit 12 with the ethylene feed gas stream passed therethrough. By the term "low temperature catalyst" is meant any conventional free radical chain-initiating catalyst, e.g., an organic peroxide, perbenzoate or peracetate, known to catalyze the polymerization of ethylene at temperatures of from about 280° to 420° F. Typical low temperature catalysts which may be so utilized include diisopropyl peroxydicarbonate, t-butyl perpivalate, lauroyl peroxide, 2,4-dichlorobenzoyl peroxide and caprylyl peroxide.

The low temperature catalyst, like the intermediate and high temperature catalysts described more fully below, is suitably fed to the reaction zone in a liquid stream in a conventional inert hydrocarbon vehicle, e.g., a refined kerosene or other inert hydrocarbon. Other materials which additionally act as modifiers in the polymerization process, e.g., cyclohexane, mineral oil, isobutylene, propylene, n-butane, or propane, may alternatively be employed as vehicles for the catalysts utilized herein. Suitably, from 0.1 to 7.0 pounds of the catalyst are dissolved per gallon of the vehicle fed through conduit 12.

As indicated hereinabove, the number and pitch of the successive sets of agitator blades disposed within zone 100 are so chosen as to produce both radial and end-to-end mixing within such zone. The reaction mixture is thereby thoroughly agitated, reaching a substantially uniform temperature of from about 280° to 340° F., preferably from about 300° to 306° F., throughout the reaction zone (see temperature levels $T_5$, $T_6$ and $T_7$ in FIGS. 1 and 2 of the drawings). The temperature in zone 100 is maintained substantially constant by agitation, supplemented by the introduction of a lower temperature fresh feed, if necessary.

The polymerization of ethylene at relatively low temperatures, e.g., below about 300° F., is a relatively unstable reaction. However, the use of lower temperatures is desirable for the formation of the desired fraction of very high molecular weight polymer. On the other hand, the use of temperatures in excess of about 340° F. results in undue decomposition of the low temperature catalyst. It is therefore desired to maintain the temperature within zone 100 within the range of from about 280° to 340° F., in order to obtain the desired product.

The reaction mixture removed from zone 100 thereafter flows around the partition 39 into the reaction zone 200. A plurality of catalysts, usually two or three in number, are introduced into the reaction mixture within such zone to catalyze the polymerization to temperatures above the 280° F. to 340° F. reaction temperature maintained in zone 100, thereby promoting the production of polymer fractions having lower molecular weights than are produced within the first zone.

Preferably, a pair of catalysts, e.g., a second, intermediate temperature catalyst, and a third, high temperature catalyst, are introduced into the zone 200, to effect polymerization at gradually increasing temperatures substantially in accordance with the temperature profile illustrated in FIG. 2 of the drawings. By intermediate temperature catalyst" is meant an ethylene polymerization catalyst such as described above, having its primary activity at temperatures within the range of from about 320° to 500° F. Such catalysts include, for example, t-butyl peroxyisobutyrate, t-butyl peracetate, p-chlorobenzoyl peroxide, and benzoyl peroxide.

By the term "high temperature catalyst" it is intended to refer to an ethylene polymerization catalyst which has its primary catalytic activity at temperatures within the range of from about 430° to 550° F. Typical high temperature catalysts which may be used in accordance with the present process include di-t-butyl peroxide, t-butyl perbenzoate, 2,5-dimethyl hexyl-2,5-diperoxy benzoate, di-t-butyl diperphthalate, and methyl ethyl ketone peroxide.

The relative proportions of the respective catalysts are dependent, inter alia, on the ethylene feed gas temperature, ethylene feed rate and the pressure under which the reaction is carried out. Employing the reaction conditions specified hereinabove, the amount of the low temperature catalyst fed to reaction zone 100 varies from about 0.1 to 10, preferably from about 0.5 to 5.2 pounds per hour. An increase of the initial sensible heat of the reaction mixture decreases the amount of the low temperature catalyst needed to catalyze the exothermic reaction to temperature levels at which the intermediate temperature catalyst is effective. Accordingly, the quantity of the low temperature catalyst is decreased when higher feed gas temperatures, within the range of from about 75° to 250° F., are utilized. The amount of the low temperature catalyst employed is, however, maintained in the proportion of from about 1.5 to 30, preferably from about 2.4 to 24, parts per part of the high temperature catalyst, in order to establish the desired temperature profile.

The intermediate and high temperature catalysts are fed into the reaction zone 200, employing at least about 0.5 parts of the intermediate temperature catalyst per part of the high temperature catalyst. Use of the intermediate temperature catalyst promotes the polymerization at intermediate reaction temperatures and serves to increase the temperature of the reaction mixture to that at which the high temperature catalyst may be "fired." It has been found that use of less than a 0.5:1 ratio does not increase the reaction temperature sufficiently to permit proper firing of the high temperature catalyst, resulting in a temperature plateau which prevents compliance with the temperature profile of FIG. 2, and may even result in termination of the polymerization reaction and decomposition of polyethylene product. Preferably, the intermediate temperature catalyst is fed to reaction zone 200 in an amount of from about 0.5 to 5 parts by weight, per part of the high temperature catalyst fed.

The intermediate and high temperature catalysts are fed to the reaction zone in a suitable carrier which may, if desired, comprise any of the materials described above as carriers for the low temperature catalyst. Suitably, the same carrier is utilized for all three catalysts in order to facilitate separation and purification of the product stream from the reaction system.

The catalysts may be fed into the reaction zone 200 in any suitable manner, either separately, in admixture, or in both separate and combined streams. Hence, the intermediate and high temperature catalysts may be introduced into zone 200 together through conduit 15; may be separately introduced through conduits 15 and 20, with the high temperature catalyst being introduced at the lower portion of the reactor through conduit 20; or, alternatively, the intermediate temperature catalyst and a portion of the high temperature catalyst may be fed through conduit 15 with a further portion of the high temperature catalyst introduced into the reaction vessel through conduit 20. However introduced, the catalyst proportions and amounts are controlled within the above ranges in order to maintain the temperature profile.

The agitator blade orientation beneath the partition is adjusted to produce both radial and end-to-end mixing within the reaction zone 200, the degree of end-to-end mixing, however, decreasing longitudinally of the zone downstream from the partition, in order that extensive back mixing does not occur. In this manner the exothermic polymerization reaction produces successively higher reaction temperatures lengthwise of the reaction zone 200, from temperatures of about 335° to 360° F. at a point $T_4$ near the entrance to zone 200 (FIGS. 1 and 2), to temperatures of from about 415° to 435° F. at a point $T_3$ intermediate the ends of zone 200, to temperatures of from about 500° to 515° at a point $T_1$ at the base of the reaction zone. The reaction temperatures thereby increase lengthwise of reaction zone 200 through an increment of the order of 200° F., as shown in the intermediate portion of the temperature profile illustrated in FIG. 2. In this manner the production of the desired polyethylene resin is insured.

It is important to maintain the temperature $T_4$ near the entrance to zone 200 at as small a value as possible, within the range indicated. If the exothermic reaction is not suitably controlled and the reaction temperature is permitted to increase at this point to values at or in excess of 400° F., the desired resin composition cannot be produced and undue decomposition of the intermediate temperature catalyst results, possibly terminating the reaction and leading to product decomposition. Maintenance of a temperature $T_4$ of from about 335° to 360° F., on the other hand, facilitates production of the desired product; moreover, it has been found that control of the temperature $T_4$ in zone 200 within the indicated range imparts improved optical characteristics to the product resin. Such temperature is assured by maintenance of the specified ratio of the intermediate to high temperature catalyst and by maintenance of the desired mixing conditions specified hereinabove.

The reaction mixture is thereafter flowed into the third zone 300 defined adjacent the base of the reaction vessel 10. The zone 300 is physically contiguous with reaction zone 200. Nevertheless, as indicated above, the agitator blade orientation within such zone is modified as compared with the configuration in zone 200, in order to produce both radial and end-to-end mixing within the zone 300, the degree of end-to-end mixing within such zone being markedly greater than the degree of end-to-end mixing at the adjacent level defining the base of the second reaction zone. The increased back mixing thus attained in the third reaction zone provides a reliable method for controlling the final temperature of the reaction mixture exiting from the reaction vessel 10.

The enthalpy characteristics of ethylene are such as to produce a marked temperature increase of the reaction mixture upon its approximate ten-fold pressure expansion from the reactor 10 to the separator 28 (the separator is suitably operated at pressures of from about 2,000 to 4,500 p.s.i.). If the reaction mixture exit temperature were not controlled in the manner described hereinabove, runaway temperatures in the exit line from the reactor or in the separator, could result in continued polymerization beyond the reactor vessel, or in explosive decomposition of the product stream. However, by controlling the mixing in reaction zone 300 as described, the temperature profile in such zone is varied from the increasing temperature profile attained in reaction zone 200 (see FIG. 2) and the reaction mixture exit temperature is maintained below about 550° F., preferably below 520° F., thereby obviating the risk of temperature runaway.

In accordance with the invention when, for example, the polymerization is conducted at a pressure of about 30,000 p.s.i. and the product stream is expanded such that the pressure within separator 28 is maintained at about 3,200 to 3,500 p.s.i., control of the mixing within the zone 300 (such that the reaction mixture exit temperature is less than about 520° F.) insures that the temperature of the expanded product stream at the separator 28 does not exceed about 590° F.

Further control of the temperature of the effluent stream may be provided, if necessary, by injecting cold ethylene feed gas through conduit 20 in the base of zone 300. Such gas can serve to quench the reaction to avoid runaway conditions.

The product stream removed from zone 300 through exit conduit 26 contains from about 2,000 to 7,000 pounds of polyethylene product per hour. This stream is expanded within the separator 28 and the polyethylene product separated therefrom in the conventional manner, ethylene gas being recycled for recompression. The re-cycled re-compressed gas may, if desired, thereafter be fed through conduit 11 to the reaction vessel for further polymerization.

The following examples illustrate preferred embodiments of the process of the present invention; it will, however, be understood that the invention is not limited to the specific procedures described therein.

EXAMPLE 1

Polyethylene resin having a balanced, broad molecular weight distribution was produced by the following technique:

Ethylene gas was fed to a stirred autoclave reactor subjected to mixing conditions providing the several reaction zones 100, 200 and 300 described hereinabove, at a rate of 20,800 pounds per hour, the ethylene being maintained under a pressure of 29,900 p.s.i. The feed was initially fed through a pre-heater and introduced into the reaction vessel at a temperature of 212° F.

The agitator was rotated at a speed of 1200 revolutions per minute during passage of the reaction mixture successively through reaction zones 100, 200 and 300.

A low temperature catalyst (diisopropyl peroxydicarbonate was continuously fed into the reaction zone 100, dissolved (0.75 pound per gallon) in a refined kerosene solvent (Soltrol 130, one of a class of petroleum naphthas commercially available from Phillips Petroleum Company), at a rate of 0.95 pound per hour.

At the same time an intermediate temperature catalyst (t-butyl-peroxyisobutyrate) and a high temperature catalyst (di-t-butyl peroxide) were fed in admixture into reaction zone 200 at the rate of 0.35 pound per hour of the intermediate temperature catalyst. The catalysts were dissolved (10% and 3.3% by weight, respectively) in a solvent mixture consisting of equal parts of mineral oil and cyclohexane.

The reaction temperatures within the reactor were determined by thermocouple measurements at a number of points spaced lengthwise of the reactor (the approximate points of temperature measurement are indicated at $T'_5$, $T'_4$, $T'_3$, $T'_2$ and $T'_1$ in FIG. 2, with respect to the reactor embodiment incorporating thermocouple $T_1$ to $T_7$ illustrated in FIG. 1.

At steady state operation the temperatures measured were $T'_5$—302° F., $T'_4$—302° F., $T'_3$—323° F., $T'_2$—405° F., and $T'_1$—502° F.

3100 pounds per hour of polyethylene product were recovered in the effluent stream removed from the reactor. This stream was expanded to 3300 p.s.i. in a separator, and the product resin separated from the ethylene stream.

EXAMPLES 2–5

Further resin samples were produced employing the procedure described in Example 1, and using the specific conditions given in Table I below:

TABLE I.—REACTION CONDITIONS UTILIZED FOR THE PRODUCTION OF RESINS OF EXAMPLES 2–5

| Example | 2 | 3 | 4 | 5 |
|---|---|---|---|---|
| Ethylene pressure | 30,000 | 30,100 | 30,200 | 30,000 |
| Ethylene feed rate (lb./hr.) | 20,500 | 30,600 | 31,800 | 20,700 |
| Feed temperature (° F.) | 208 | 231 | 213 | 216 |
| $T'_5$ (° F.) | 301 | 301 | 301 | 302 |
| $T'_4$ (° F.) | 302 | 301 | 300 | 302 |
| $T'_3$ (° F.) | 326 | 318 | 312 | 323 |
| $T'_2$ (° F.) | 409 | 422 | 421 | 403 |
| $T'_1$ (° F.) | 504 | 512 | 517 | 502 |
| Low temp. catalyst [1] (lbs./hr.) | 1.02 | 1.12 | 1.53 | 0.8 |
| Intermediate temp. catalyst [2] (lbs./hr.) | 0.63 | 0.69 | 0.85 | 0.42 |
| High temp. catalyst [3] (lbs./hr.) | 0.21 | 0.13 | 0.15 | 0.14 |
| Modifier [4] (lbs./hr.) | 25 | 45 | 50 | 30 |
| Separator temp. (° F.) | 583 | 590 | 596 | 580 |
| Separator pressure (p.s.i.) | 3,400 | 3,400 | 3,400 | 3,400 |
| Polymer production rate (lbs./hr.) | 3,100 | 4,250 | 4,850 | 3,100 |

[1] Diisopropyl peroxydicarbonate.
[2] t-Butyl peroxyisobutyrate.
[3] di-t-Butyl peroxide.
[4] Isobutylene.

The optical and film forming characteristics of the resins produced in Examples 1–5 were determined in conventional manner (in accordance with ASTM procedures) by extruding thin films from the respective resins, and determining the optical characteristics thereof, e.g., fisheyes, haze, gloss and transmittance ratios, and the film properties, e.g., tear strengths, tensile stresses and drawdown characteristics. The characteristics thus determined are set forth in Table II below:

TABLE II.—OPTICAL AND FILM FORMING CHARACTERISTICS OF RESINS OF EXAMPLES 1–5

| Example | 1 | 2 | 3 | 4 | 5 |
|---|---|---|---|---|---|
| Melt index (g./10 min.) | 2.1 | 2.8 | 2.0 | 2.0 | 7.6 |
| Density (g./cc.) | 0.924 | 0.924 | 0.925 | 0.928 | 0.9245 |
| Fisheyes (No./50 in.²) | 0.23 | 0.15 | 0.31 | 0.23 | 0.55 |
| Friction factor | 0.07 | 0.12 | <0.07 | 0.09 | 0.09 |
| Haze (percent) | 3.2 | 3.1 | 3.9 | 6.2 | 4.4 |
| Gloss (percent) | 11.2 | 13.2 | 11.8 | 10.6 | 10.8 |
| Transmittance (T) | 76 | 71 | 61 | 59 | 79 |
| Dart drop/gauge (g./mil) | 96/1.4 | 102/1.5 | 90/1.5 | 92/1.5 | <50/0.9 |
| Elmendorf tear (g./mil): | | | | | |
| MD [1] | 372 | 369 | 350 | 330 | 388 |
| TD [2] | 235 | 233 | 218 | 202 | 356 |
| Ultimate tensile (p.s.i.): | | | | | |
| MD | 3,220 | 3,060 | 2,770 | 2,600 | |
| TD | 3,080 | 2,930 | 2,600 | 2,330 | |
| Yield tensile (p.s.i.): | | | | | |
| MD | 1,840 | 1,890 | [3] NP | [3] NP | |
| TD | 1,760 | 1,930 | 1,610 | 1,620 | |
| Elongation (percent): | | | | | |
| MD | 410 | 420 | 410 | 330 | |
| TD | 630 | 580 | 610 | 540 | |
| Modulus (p.s.i.): | | | | | |
| MD | 30,800 | 32,200 | 29,500 | 28,600 | |
| TD | 33,400 | 35,000 | 33,000 | 32,600 | |
| Drawdown (f.p.m./mil) | 130/0.4 | 140/0.4 | 160/0.4 | 150/0.4 | 160/0.3 |

[1] MD=The value of the force measured in the machine direction.
[2] TD=The value of the force measured in the transverse direction.
[3] NP=indicates no point of measurement.

For comparison with the resins produced in Examples 1–5, additional resin samples were obtained, prepared by various methods other than by use of the modified stirred autoclave type system of the present invention. A first resin (Control A) was prepared within a stirred autoclave reactor maintained at a single uniform reaction temperature, the polymerization being catalyzed by a single free radical, chain-initiating catalyst. A second resin (Control B) was prepared employing a stirred autoclave reactor but utilizing two catalysts producing a split-temperature profile within the reaction system. A further pair of resins (Controls C, D) were commercially obtained, believed to have been produced within a tubular reaction system.

Control A was prepared within a stirred autoclave reactor to which ethylene gas under 30,000 p.s.i. pressure was fed at a temperature of 150° F. The polymerization was catalyzed with t-butyl peracetate, a catalyst having a maximum efficiency at temperatures of from about 350° F. to 410° F. The reaction mixture was thoroughly stirred to maintain a uniform temperature therein, an isothermal reaction being maintained at a temperature of 410° F.

Control B was prepared by reaction within a stirred autoclave reactor to which ethylene gas under 22,000 p.s.i. pressure was fed at a temperature of 120° F. A first, low temperature catalyst (t-butyl perpivalate, having a maximum efficiency at temperatures of from 320° to 420° F.) was fed into the reactor at two separate inlets disposed near the feed gas entry. A second, high temperature catalyst (t-butyl perbenzoate having a maximum efficiency at temperatures of from 433° to 490° F.) was introduced into the reaction mixture at a point further down the reactor column.

The reactor was agitated such that a pair of distinct reaction regions were defined, the reaction temperatures spaced longitudinally of the reactor in the manner described in Example 1, having the following values:

$$
\begin{aligned}
T'_5 &\quad 340 \pm 3 \\
T'_4 &\quad 363 \pm 3 \\
T'_3 &\quad 485 \pm 10 \\
T'_2 &\quad 485 \pm 10 \\
T'_1 &\quad 498 \pm 3
\end{aligned}
$$
(° F.)

The resulting temperature profile was found to be extremely sensitive to slow changes in ethylene feed gas rate, an excessive fraction of lost reactions occurring in the higher temperature, lower portion of the reaction zone, resulting in poor production economics and wide lot-to-lot variation in product characteristics. One product lot was, however, extruded into film and the optical and film forming characteristics thereof determined, as indicated below.

Each of the control resins was extruded into film and the optical and processing characteristics determined in the same fashion as with the resins of Examples 1–5. The characteristics determined are indicated in Table III below:

TABLE III.—OPTICAL AND FILM FORMING CHARACTERISTICS OF CONTROL RESIN A–D

| Control | A | B | C | D |
|---|---|---|---|---|
| Melt index (g./10 min.) | 2.9 | 2.0±0.2 | 1.8 | 1.4 |
| Density (g./cc.) | 0.923 | 0.9235±0.0015 | 0.925 | 0.924 |
| Fisheyes (No./50 in.²) | 0.23 | [3] NP | 0.31 | 1.31 |
| Friction factor | 0.09 | [3] NP | 0.09 | 0.49 |
| Haze (percent) | 4.0 | 20.7±2.5/2 | 3.8 | 5.0 |
| Gloss (percent) | 11.0 | 4.5±0.4 | 11.7 | 10.1 |
| Transmittance (T) | 68 | 27.1+8.2−6.3 | 51 | 51 |
| Dart drop/gauge (g./mil) | 88/1.5 | 145 | 98/1.4 | 99/1.3 |
| Elmendorf tear (g./mil): | | | | |
|   MD [1] | 202 | 90 | 255 | 210 |
|   TD [2] | 127 | 72 | 300 | 250 |
| Ultimate tensile (p.s.i.): | | | | |
|   MD | 2,830 | 2,290 | 3,430 | 3,170 |
|   TD | 2,890 | 1,760 | 3,100 | 3,180 |
| Yield tensile (p.s.i.): | | | | |
|   MD | [3] NP | 1,290 | [3] NP | [3] NP |
|   TD | 1,500 | 1,390 | 1,750 | 1,810 |
| Elongation percent: | | | | |
|   MD | 450 | 305 | 410 | 330 |
|   TD | 520 | 405 | 560 | 550 |
| Modulus (p.s.i.): | | | | |
|   MD | 26,700 | [3] NP | 34,100 | 34,000 |
|   TD | 30,100 | [3] NP | 34,900 | 36,400 |

[1] MD = The value of the force measured in the machine direction.
[2] TD = The value of the force measured in the transverse direction.
[3] NP = Indicates no point of measurement.

From a comparison of the characteristics indicated in Tables II and III, it will be evident, for example, that the optical characteristics of the resin produced in Example 2, having substantially the same melt index as Control A, are superior to the latter; hence, the percentage haze, the percentage gloss, and the transmittance are all superior to the corresponding characteristics of Control A. Similarly, the film processing characteristics of the resin of Example 2 are superior to the corresponding characteristics of Control A with respect to Dart Drop, Elmendorf Tear, Utimate Tensile Stress, Yield Tensile Stress, and Modulus of Elasticity. Similarly, the resins produced in accordance with Examples 3 and 4 possess superior characteristics with respect to Control B (having approximately the same melt index) in the following respects: Haze, Gloss, Elmendorf Tear, and Ultimate Tensile Stress. Further consideration of the data presented in Tables II and III will indicate other advantages of the resins produced in accordance herewith.

EXAMPLE 6

A further polyethylene resin was produced employing a procedure substantially as described in Example 1. Ethylene gas was fed into the reaction system at a rate of 22,000 pounds per hour under a pressure of 30,000 p.s.i., employing a feed gas temperature of 225° F. The low temperature, intermediate temperature and high temperature catalysts employed in Example 1 were introduced into reaction zones 100 and 200 in the amounts of 0.8 pound/hour, 0.4 pound/hour and 0.2 pound/hour, respectively.

The reactor was agitated in the manner described hereinabove to maintain the reaction temperature in the several reaction zones at temperatures substantially corresponding to those indicated in the temperature profile illustrated in FIG. 2. The temperatures at the several levels of the reactor corresponding to the levels indicated in FIGS. 1 and 2 were as follows: $T'_5$—300° F.; $T'_4$—300° F.; $T'_3$—334° F.; $T'_2$—412° F.; $T'_1$—504° F.

The resulting resin was extruded into film and the optical and film properties thereof determined; these characteristics are set forth in Table IV below.

EXAMPLE 7

An additional resin was produced in accordance with the procedure of Example 1. Ethylene gas was fed into the reaction system at a rate of 22,000 pounds per hour under a pressure of 30,000 p.s.i., employing a feed gas temperature of 225° F. The low temperature, intermediate temperature and high temperature catalyst employed in Example 1 were introduced into reaction zones 100 and 200 in the amounts of 1.0 pound/hour, 0.3 pound/hour and 0.3 pound/hour, respectively.

The reactor was agitated in the manner described hereinabove, and the reaction temperatures determined as follows: $T'_5$—291° F.; $T'_4$—291° F.; $T'_3$—350° F.; $T'_2$—395° F.; $T'_1$—510° F.

The resulting resin was extruded into film and the optical and film properties thereof determined; these characteristics are also set forth in Table IV.

For comparison, it was attempted to produce polyethylene resins employing a stirred autoclave reaction system similar to that employed in Examples 6 and 7, but utilizing two rather than three catalysts, as indicated below. The reaction conditions were adjusted in an effort to maintain the temperature profile illustrated in FIG. 2 of the drawings.

A pair of resins (Controls E and F) were thus produced by feeding ethylene gas at feed rates of 22,000 pounds per hour and 21,000 pounds per hour, respectively, under 30,000 p.s.i. pressure, employing feed temperatures of 225° F. and 220° F., respectively.

A low temperature (diisopropyl peroxydicarbonate) catalyst having a maximum efficiency at from 280° to 330° F., and a high temperature (di-t-butyl peroxide) catalyst having a maximum efficiency at 460° to 530° F., were introduced at separate points along the length of the reactor in the amounts of 1.6 pounds/hour and 0.4 pound/hour, respectively, in the production of Control E. In the production of Control F 1.0 pound/hour of the low temperature catalyst (diisopropyl peroxydicarbonate) and 0.8 pound/hour of a different high temperature catalyst (t-butyl perbenzoate having a maximum efficiency at from 433° to 498° F.) were introduced at separate points along the length of the reaction vessel employed.

In the production of the first resin (Control Resin E) the reaction temperatures lengthwise of the reaction vessel were as follows: $T'_5$—300° F.; $T'_4$—301° F.; $T'_3$—416° F.; $T'_2$—490° F.; $T'_1$—525° F. In the production of the second resin (Control F) the temperatures lengthwise of the reaction vessel were as follows: $T'_5$—302° F.; $T'_4$—301° F.; $T'_3$—315° F.; $T'_2$—345° F.; $T'_1$—509° F.

The second reaction was unstable when the temperature at $T'_2$ was greater than 345° F. or less than 480° F., abrupt temperature changes occurring when it was attempted to stabilize the $T'_2$ temperature at about 410° F., in accordance with the desired temperature profile. After several such abrupt temperature changes, decomposition occurred. The desired temperature profile could not, therefore, be maintained.

Resins produced in the two control tests were extruded into films and the optical and film properties thereof determined; these characteristics are listed in Table IV, for comparison with the characteristics of films produced from the resins of Examples 6 and 7.

TABLE IV.—OPTICAL AND FILM FORMING CHARACTERISTICS OF RESINS OF EXAMPLES 6 AND 7 AND CONTROL RESINS E AND F

|  | Example | | Control | |
|---|---|---|---|---|
|  | 6 | 7 | E | F |
| Melt index, g./10 min | 2.3 | 2.4 | 2.2 | 1.1 |
| Density, g./cc | 0.9248 | 0.9230 | 0.9220 | 0.9242 |
| Haze, percent | 5.0 | 7.6 | 5.6 | 5.9 |
| Gloss, percent | 10.5 | 8.6 | 9.2 | 9.4 |
| Dart drop/gauge, g./mil | 92 | 106 | 84 | 130 |
| Elmendorf tear, g./mil.: | | | | |
| MD | 200 | 150 | 130 | 150 |
| TD | 190 | 150 | 100 | 150 |
| Ultimate tensile, p.s.i.: | | | | |
| MD | 2,770 | 2,750 | 2,930 | 2,690 |
| TD | 2,550 | 2,480 | 2,570 | 2,170 |
| Yield tensile, p.s.i.: | | | | |
| MD | N.P. | N.P. | N.P. | N.P. |
| TD | 1,600 | 1,470 | 1,390 | 1,460 |
| Elongation, percent: | | | | |
| MD | 440 | 420 | 410 | 400 |
| TD | 500 | 560 | 560 | 500 |
| Modulus, p.s.i., MD | 27,900 | 28,900 | 26,300 | 23,300 |
| 2½" Hartig—Hartig Die: | | | | |
| Haze | 5.3 | 6.1 | 7.3 |  |
| Gloss | 9.9 | 8.6 | 7.7 |  |
| Impact | 89 | 101 | 98 |  |
| Egan Die: | | | | |
| Haze | 3.7 | 4.6 | 6.4 |  |
| Gloss | 10.9 | 10.3 | 9.1 |  |
| Impact | 81 | 81 | 86 |  |

NOTE.—N.P. indicates no point of measurement.

It will be noted from Table IV that the resins produced in accordance with the method of the present invention (Examples 6 and 7) possessed better optical and processing characteristics than Control Resins E and F when, for example, extruded into film on a 2½" Hartig extrusion line.

Since various changes may be made in the preferred embodiments of the apparatus and process for effecting high pressure polymerization of ethylene in accordance with the present invention, without departing from the scope thereof, it will be understood that the preceding description and the accompanying drawings should be interpreted as illustrative and not in a limiting manner.

What is claimed is:

1. A high pressure process for the production of ethylene polymers which comprises:
    (a) feeding ethylene gas at a rate of from 20,000 to 40,000 pounds per hour into a longitudinally extending, generally cylindrical reaction region having a length-to-diameter ratio of from 15:1 to 20:1, the reaction mixture fed through said region being maintained under a pressure of from 25,000 to 45,000 p.s.i. and at temperatures within the range of from 280° to 550° F.;
    (b) feeding said ethylene gas longitudinally through a first reaction zone within said region;
    (c) adding diisopropyl peroxydicarbonate to the reaction mixture within said first zone in an amount of from 0.1 to 10 pounds per hour;
    (d) agitating the reaction mixture within said first zone to produce both radial and end-to-end mixing thereof, thereby maintaining a substantially uniform reaction temperature within the range of from 280° to 340° F. therein;
    (e) removing the reaction mixture from the end of said first zone and introducing the same into a second reaction zone within said region;
    (f) adding t-butyl peroxyisobutyrate and di-t-butyl peroxide to the reaction mixture within said second zone in the proportion of 1 part by weight of said di-t-butyl peroxide for every 1.5 to 30 parts of said diisopropyl peroxydicarbonate and every 0.5 to 5 parts of said t-butyl peroxyisobutyrate;
    (g) agitating the reaction mixture within said second zone to produce radial mixing therein, the degree of end-to-end mixing decreasing longitudinally of said zone to thereby establish a temperature differential longitudinally thereof, the temperature of the reaction mixture within said second zone varying substantially linearly from within the range of from 335° to 360° F. adjacent said first zone to within the range of from 500° to 515° F. at the outlet of said second zone;
    (h) removing the reaction mixture from the outlet of said second zone and introducing the same into a third zone within said region;
    (i) agitating the reaction mixture within said third zone to produce both radial and end-to-end mixing therein, the degree of end-to-end mixing in said third zone being greater than the degree of end-to-end mixing at the adjacent end of said second zone to increase back mixing of the reaction mixture therein, thereby maintaining the temperature of the reaction mixture exiting from said third zone at temperatures below 550° F.; and
    (j) removing the reaction mixture from said third zone and separating the ethylene polymer product therefrom.

2. The process as defined in claim 1, in which said t-butyl peroxyisobutyrate and said di-t-butyl peroxide are fed in admixture into the reaction mixture within said second zone.

3. The process as defined in claim 1, in which said t-butyl peroxyisobutyrate and said di-t-butyl peroxide are separately introduced into the reaction mixture in said second zone.

4. The process as defined in claim 1, in which said t-butyl peroxyisobutyrate and a portion of said di-t-butyl peroxide are fed in admixture into the reaction mixture within said second zone, and in which a further portion of said di-t-butyl peroxide is separately introduced into the reaction mixture in said second zone.

5. The process as defined in claim 1, in which a co-monomer selected from the group consisting of propylene, isobutylene and vinyl acetate is fed into the reaction system and a copolymer of ethylene with said co-monomer is recovered as product therefrom.

References Cited

UNITED STATES PATENTS

| | | | |
|---|---|---|---|
| 3,293,233 | 12/1966 | Erchak et al. | 260—94.9 |
| 2,868,762 | 1/1959 | Oakes | 260—94.9 |
| 3,178,404 | 4/1965 | Vaughn et al. | 260—94.9 |
| 3,349,072 | 10/1967 | Alexander et al. | 260—94.9 |
| 2,964,515 | 12/1960 | Rader | 260—94.9 |

FOREIGN PATENTS

| | | |
|---|---|---|
| 1,109,611 | 4/1968 | Great Britain. |
| 1,264,148 | 5/1961 | France. |

OTHER REFERENCES

Raff et al., Crystalline Olefin Polymers, vol. XX, Part I, Interscience Publishers, N.Y., 1965, pp. 323-324.

JOSEPH L. SCHOFER, Primary Examiner

E. J. SMITH, Assistant Examiner

U.S. Cl. X.R.

23—283, 288 E; 260—88.2 R, 94.9 R